Dec. 25, 1923.  
T. LUMSDEN  
SURFACE GRINDING MACHINE  
Filed Feb. 9, 1923  
1,478,971  
2 Sheets-Sheet 1

Inventor
Thomas Lumsden,
By Toulmin & Toulmin,
Attorneys

Dec. 25, 1923.
T. LUMSDEN
1,478,971
SURFACE GRINDING MACHINE
Filed Feb. 9, 1923   2 Sheets-Sheet 2
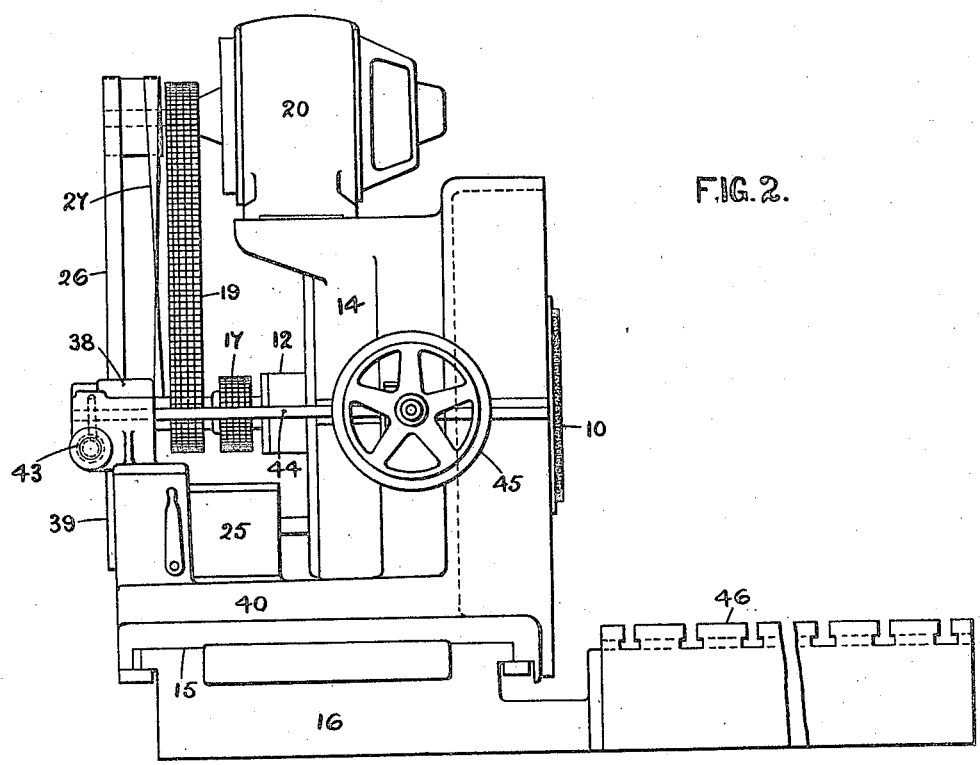
FIG. 2.
FIG. 3.
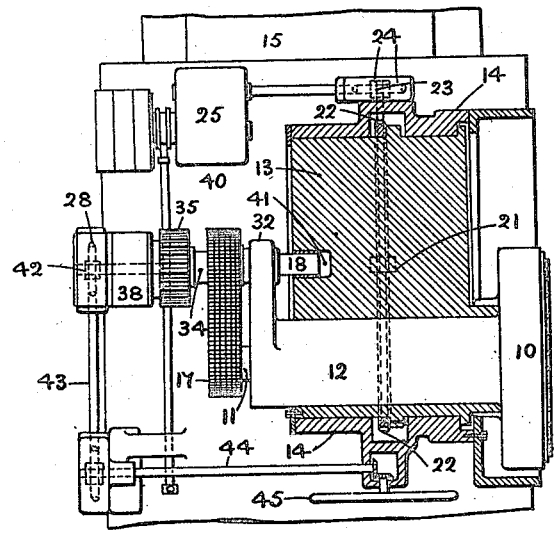
Inventor
Thomas Lumsden,
By Toulmin & Toulmin,
Attorneys Patented Dec. 25, 1923.

1,478,971

UNITED STATES PATENT OFFICE.

THOMAS LUMSDEN, OF GATESHEAD-ON-TYNE, ENGLAND.

SURFACE-GRINDING MACHINE.

Application filed February 9, 1923. Serial No. 617,914.

*To all whom it may concern:*

Be it known that I, THOMAS LUMSDEN, a subject of the King of Great Britain and Ireland, residing at Gateshead-on-Tyne, in the county of Durham, England, have invented certain new and useful Improvements in Surface-Grinding Machines, of which the following is a specification, reference being had therein to the accompanying drawing.

This invention relates to surface grinding machines for producing flat surfaces, and relates particularly to that type of machine wherein a rotary grinding wheel of comparatively small diameter is utilized for grinding large surfaces by mounting it in a ram eccentrically mounted in an independently rotated carrier within a housing. The object of the present invention is to provide an improved construction.

In a surface grinding machine of the type above referred to in accordance with my present invention the eccentric ram carrying the grinding wheel spindle is axially adjustable to feed the wheel by a revoluble nut on a non-rotary screwed spindle coaxial with the carrier, and the drive to the grinding wheel spindle is through a rotary sleeve on said screwed spindle adapted to slide axially therewith. The spindle of the grinding wheel may be horizontal or vertical. The grinding wheel may be of the segmental type or may be a cup wheel.

Figure 1:
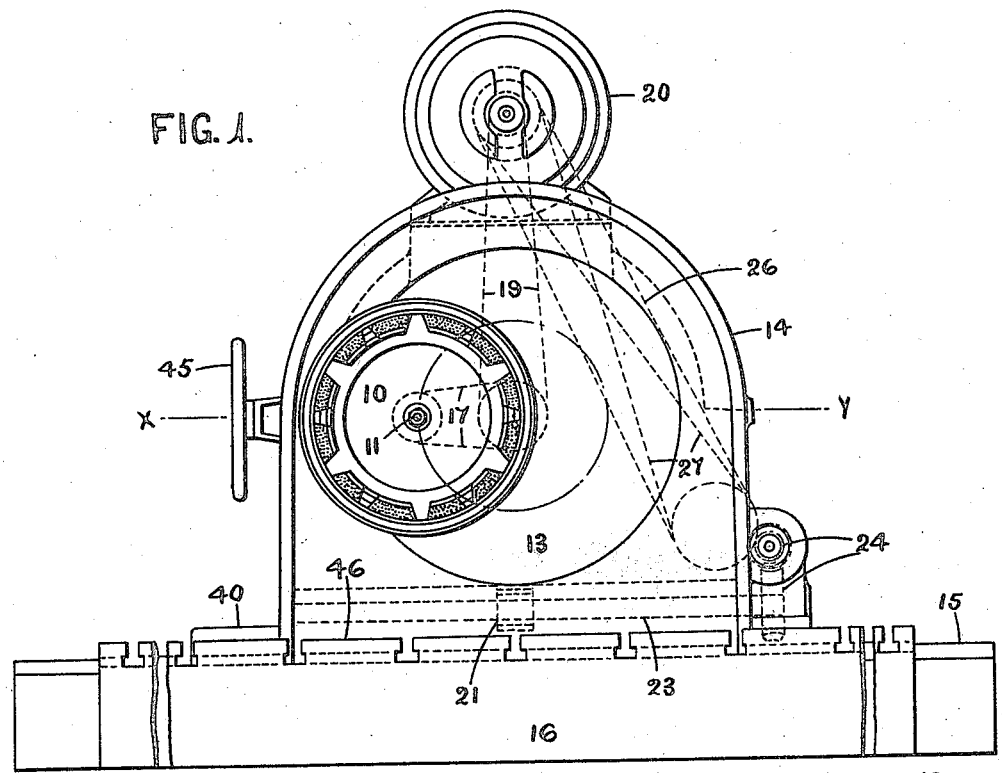
Figure 4:
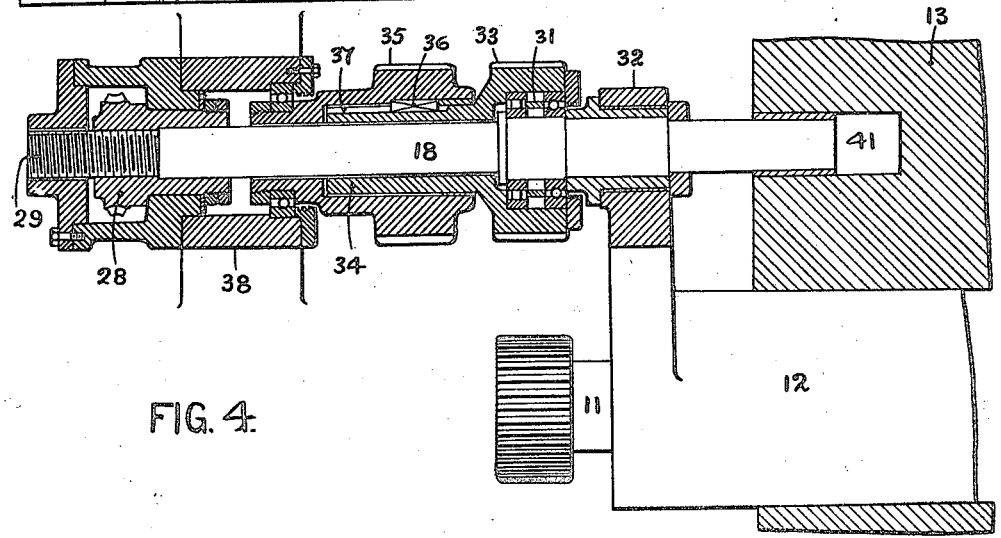

I will more fully describe my invention with reference to the accompanying drawings which illustrate one construction of horizontal surface grinding machine embodying the same. In the drawings, Figures 1 and 2 are a front elevation and a side elevation respectively of the machine. Figure 3 is a sectional plan on the line X—Y in Fig. 1, and Figure 4 is a part view similar to Fig. 3 to a larger scale.

Referring to the drawings, the machine therein illustrated comprises a segmental grinding wheel 10 on a horizontal rotary spindle 11 carried by a ram 12 mounted eccentrically of a revoluble carrier 13 in a housing 14 on a longitudinal slide 15 on a bed plate 16. The rotary spindle 11 is driven through chain or other suitable gearing 17 from a sleeve 34 on a spindle 18 coaxial with the carrier 13, said sleeve 34 being revolved by chain gearing 19 from the spindle of an electric motor 20 or through other suitable gearing from a convenient source of rotary power. The carrier 13 is revolved by a worm 21 (Figs. 1 and 3) engaging a worm wheel 22 (Fig. 3) around the carrier, the shaft 23 of said worm being driven through suitable gearing 24 and control gear 25 and either a parallel belt 26 or crossed belt 27 from the spindle of the motor 20, the arrangement being such that the carrier 13 can be revolved in either direction or oscillated to and fro through a portion of a revolution. The ram 12 carrying the wheel spindle 11 is axially adjustable within the carrier 13 to feed the wheel 10 to its work by a nut 28 (Fig. 4) on a screwed portion 29 of the spindle 18, said spindle being capable of sliding endwise but prevented from rotating by a key 30, the sliding movements of the spindle 18 being transmitted through a thrust bearing 31 to a lug 32 on the ram 12, the sprocket wheel 33 of the chain drive 17 being loose on the spindle 18 and having a sleeve 34 to which the chain sprocket 35 of the chain drive 19 is attached by a key 36 in a groove 37. The sprocket 35 does not slide, the spindle 18 and the sleeve 34 sliding within it. The spindle 18 is carried by a bearing 38 at its rear end supported by a bracket 39 on the base plate 40 of the housing 14, and at the front end the spindle 18 rests in a recess 41 in the centre of the rear face of the carrier 13. The nut 28 is rotated by a worm 42 on a transverse shaft 43 coupled by suitable gearing and a shaft 44 to the spindle of a handwheel 45. The housing 14 is adapted to be travelled along the slide 15 of the bed plate in any convenient known manner. The bed plate also carries a work table 46.

It will be seen that, by rotating the carrier 13, the grinding wheel 10 will be caused to cover an annular path about the axis of the carrier equal in width to the diameter of the wheel. The eccentricity of the wheel is preferably slightly less than half the diameter of the wheel so that the edge of the wheel overlaps the axis of the carrier. The covering capacity of the wheel is, in this case, equal to that of a wheel of nearly double its diameter. For facing large pipe flanges and similar work, the housing may be stationary, the pipe being disposed so that its axis is in alignment with that of the carrier 13. For work of considerable length, the housing is slidden laterally. For small work the carrier is oscillated to and fro through a portion of a revolution.

While I have described a horizontal surface grinding machine as one embodiment of my invention, it will be understood that my invention is also applicable to surface grinding machines wherein the spindle of the grinding wheel is vertical, and that, in this case, I may employ either a fixed, a rotary or a reciprocating work table.

What I claim as my invention and desire to secure by Letters Patent is:—

1. In a surface grinding machine for producing flat surfaces, the combination of a bed, a housing mounted thereon, a carrier within said housing, means for rotating said carrier, a ram eccentrically mounted in said carrier, a grinding wheel mounted in said ram, a non-rotary threaded spindle co-axial with said carrier, a lug on said ram fixedly attached to said spindle, a nut on said spindle restrained from axial movement, means for rotating said nut to axially travel the spindle to feed forward and retract the eccentric ram carrying the grinding wheel, and means for rotatably driving the grinding wheel independently of the carrier.

2. In a surface grinding machine for producing flat surfaces, the combination of a bed, a housing mounted thereon, a carrier within said housing, means for rotating said carrier, a ram eccentrically mounted in said carrier, a grinding wheel mounted in said ram, a non-rotary threaded spindle co-axial with said carrier, a lug on said ram fixedly attached to said spindle, a nut on said spindle restrained from axial movement, means for rotating said nut to axially travel the spindle to feed forward and retract the eccentric ram carrying the grinding wheel, a sleeve loose on said threaded spindle but adapted to slide axially therewith, means for rotating said sleeve, and means for transmitting the rotation of said sleeve to the grinding wheel whereby said grinding wheel is rotatably driven independently of the carrier.

3. In a horizontal surface grinding machine for producing flat surfaces, the combination of a bed, a longitudinal slide thereon, a housing mounted on said slide, a carrier within said housing, means for rotating said carrier, a ram eccentrically mounted in said carrier, a grinding wheel mounted in said ram, a non-rotary threaded spindle co-axial with said carrier, a lug on said ram fixedly attached to said spindle, a nut on said spindle restrained from axial movement, means for rotating said nut to axially travel the spindle to feed forward and retract the eccentric ram carrying the grinding wheel, a sleeve loose on said threaded spindle but adapted to slide axially therewith, means for rotating said sleeve, and means for transmitting the rotation of said sleeve to the grinding wheel whereby said grinding wheel is rotatably driven independently of the carrier.

In testimony whereof, I affix my signature.

THOMAS LUMSDEN.